United States Patent
Joshi et al.

(10) Patent No.: US 11,055,218 B2
(45) Date of Patent: Jul. 6, 2021

(54) APPARATUS AND METHODS FOR ACCELERATING TASKS DURING STORAGE CACHING/TIERING IN A COMPUTING ENVIRONMENT

(71) Applicant: SAMSUNG ELECTRONICS CO., LTD., Suwon-si (KR)

(72) Inventors: Kanchan Joshi, Bangalore (IN); Suresh Vishnoi, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/422,253

(22) Filed: May 24, 2019

(65) Prior Publication Data
US 2020/0293462 A1    Sep. 17, 2020

(30) Foreign Application Priority Data
Mar. 13, 2019    (IN) .............................. 201941009729

(51) Int. Cl.
*G06F 12/0804* (2016.01)
*G06F 13/16* (2006.01)
*G06F 13/37* (2006.01)

(52) U.S. Cl.
CPC ........ *G06F 12/0804* (2013.01); *G06F 13/161* (2013.01); *G06F 13/1689* (2013.01); *G06F 13/37* (2013.01)

(58) Field of Classification Search
None
See application file for complete search history.

(56) References Cited

U.S. PATENT DOCUMENTS

| | | | |
|---|---|---|---|
| 8,402,226 B1* | 3/2013 | Faibish | G06F 12/0804 710/52 |
| 2010/0228922 A1* | 9/2010 | Limaye | G06F 12/0897 711/135 |
| 2016/0077745 A1 | 3/2016 | Patel et al. | |
| 2016/0085674 A1* | 3/2016 | Sterns | G06F 12/0804 711/143 |
| 2016/0292116 A1 | 10/2016 | Wakhare et al. | |
| 2020/0133857 A1* | 4/2020 | Randolph | G06F 12/0802 |

* cited by examiner

*Primary Examiner* — Charles J Choi
(74) *Attorney, Agent, or Firm* — F. Chau & Associates, LLC (57) ABSTRACT

An apparatus for accelerating tasks during storage caching and tiering includes a processor. First and second storage units are coupled to the processor. A memory unit is coupled to the processor. The memory unit is configured to receive a write data operation. An amount of dirty data in the first storage unit is determined based on the received write data operation. The dirty data includes data present in the first storage unit to be synced to the second storage unit. A sync rate associated with a read data operation from the first storage unit to the second storage unit is decelerated when the amount of dirty data is less than a first threshold value. A write rate associated with a write data operation to the first storage unit is accelerated when the amount of dirty data is less than the first threshold value.

19 Claims, 7 Drawing Sheets

APPARATUS AND METHODS FOR ACCELERATING TASKS DURING STORAGE CACHING/TIERING IN A COMPUTING ENVIRONMENT

CROSS-REFERENCE TO RELATED APPLICATION

This application claims the benefit of, and priority to, Indian Patent Application No. 201941009729, filed on Mar. 13, 2019 in Intellectual Property India, the disclosure of which is herein incorporated by reference in its entirety.

TECHNICAL FIELD

The present disclosure relates to the field of data storage systems and more particularly to apparatus and methods for accelerating tasks during storage caching/tiering in a computer environment.

DISCUSSION OF THE RELATED ART

In general, a storage system may include one or more memory storage devices, such as Solid State Drives (SSDs) which may comprise a memory storage array based on flash memory. Information may be stored in the SSD and the information may then be read from the SSD, as desired. A multi-tiered system of data storage may include a plurality of different data storage solutions such as a first data storage solution for quick read/write access (e.g. a cache) and a second data storage solution that may have slower read/write access but larger storage space (e.g. a main storage). An example of a multi-tiered data storage system may be a hybrid SSD device in which a Hard Disk Drive (HDD) is used as the main storage and an SSD is used as the cache. In a multi-tiered systems of data storage, information may originally be written to the faster data storage solution and then may be migrated to the slower data storage solution in a single write operation. This approach to cache management may be considered a write-back method.

According to the write-back method, as it is possible for information in the cache to be modified before it has been migrated to the main storage, the system must keep track of which cached information is "clean" (i.e. unmodified) and which cached information is "dirty" (i.e. modified).

Further, in the write-back method, bandwidth of the SSD, such as cache/tier device, may be shared between external write data operation and internal read data operation. The speed of write data operation (i.e. input from user/application) can be reduced due to contention with internal read data operation (i.e. syncing between storage devices). If cache/tier storage device is developing into completely dirty (i.e. no clean space), an additional write data operation might not be considered by SSD and can be bypassed to write to a slow backend device such as Hard Disk Drive (HDD).

Figure 1A:
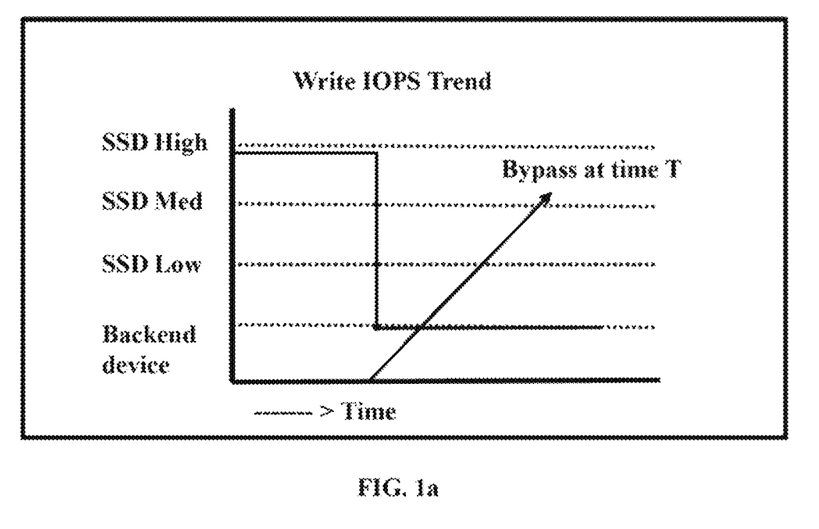
FIG. 1a is a graph diagram illustrating bypass time related to write data operation.

FIG. 1a is a graph showing bypass time related to write data operation. The write data operation is at a relatively high speed, if the clean space of the SSD is high. Further, if the clean space of SSD is zero, then the write data operation is bypassed directly to the backend storage device at earlier stages of the write data operation.

Figure 1B:
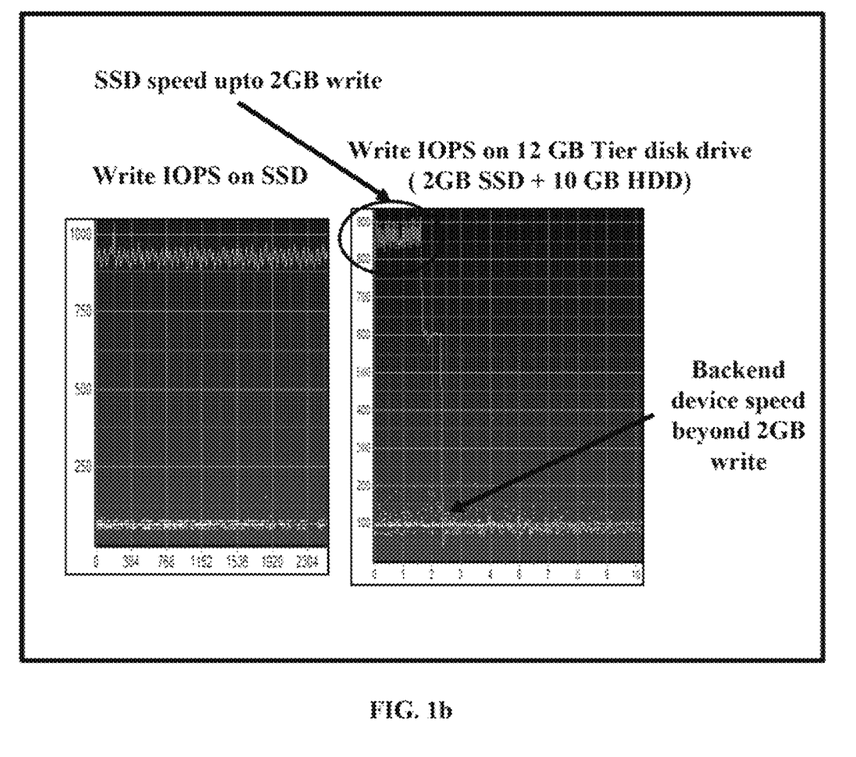
FIG. 1b is a graph illustrating Input/output Operations Per Second (IOPS) trend.

FIG. 1b is a graph illustrating Input/output Operations Per Second (IOPS) trend. The method for write policy may be configured to complete the write data operation from a faster cache/tier device, if there is clean space and to bypass the write data operation to the backend, if there is no clean space. Further, the sync policy may be configured to wait for disk idle time (i.e. absence of incoming write data operation) before performing sync/read data operation.

According to another method, the write policy may be configured to complete write data operation from a faster cache/tier device, if there is clean space, and to bypass the write data operation to the backend, if there is no clean space. Further, the sync policy may be configured to start sync/read data operation in the background as soon as a subsequent write data operation is completed.

According to another method, each external I/O flow may be decomposed into multiple internal I/O flows. This method includes tracking I/O flows, calculating demand and assigning credits.

However, these methods do not allow sharing bandwidth between the write data operation and the sync/read data operation. Also, these methods dos not allow managing contention between write data operation and sync/read data operation with intent of serving the write data operation by the faster device (i.e. cache/tier), as much as possible.

SUMMARY

An apparatus for accelerating tasks during storage caching and tiering, in a computing environment, includes a processor. A first storage unit is coupled to the processor. A second storage unit is coupled to the processor. A memory unit is coupled to the processor. The memory unit includes a processing module configured to receive a write data operation from the computing environment. An amount of dirty data in the first storage unit is determined based on the received write data operation. The dirty data includes data present in the first storage unit to be synced to the second storage unit. A sync rate associated with a read data operation from the first storage unit to the second storage unit is decelerated when the determined amount of dirty data is less than a first threshold value. A write rate associated with a write data operation from the computing environment to the first storage unit is accelerated when the determined amount of dirty data is less than the first threshold value.

A method for accelerating tasks during storage caching and tiering, in a computing environment, includes receiving, by a processor, a write data operation from the computing environment. The processor determines an amount of dirty data in the first storage unit, based on the received write data operation. The dirty data includes data present in the first storage unit to be synced to the second storage unit. The processor determines a sync rate associated with a read data operation from the first storage unit to the second storage unit, when the determined amount of dirty data is less than a first threshold value. The processor accelerates a write rate associated with a write data operation from the computing environment to the first storage unit, when the determined amount of dirty data is less than the first threshold value.

BRIEF DESCRIPTION OF FIGURES

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure relate to an apparatus and methods for accelerating tasks during storage caching and tiering in a computing environment, based on managing the balance between speed of a sync/read data operation and a speed of write data operation.

Additionally, exemplary embodiments of the present disclosure relate to an apparatus and methods for managing and prioritizing speed transition using Non-Volatile Memory express—Weighted Round Robin (NVMe WRR) for Non-Volatile Memory express-Solid State Drive (NVMe-SSD) based storage devices.

Additionally, exemplary embodiments of the present disclosure relate to an apparatus and methods for reducing occurrence of events such as bypass-to-backend storage device (i.e. write data operation), within a pre-determined time.

Exemplary embodiments of the present disclosure relate to an apparatus and methods for accelerating tasks during storage caching and tiering in a computing environment. Referring now to the drawings, and more particularly to FIGS. 2a through 7, it is noted that similar reference characters may denote corresponding features throughout the figures and the detailed description thereof.

Figure 2A:
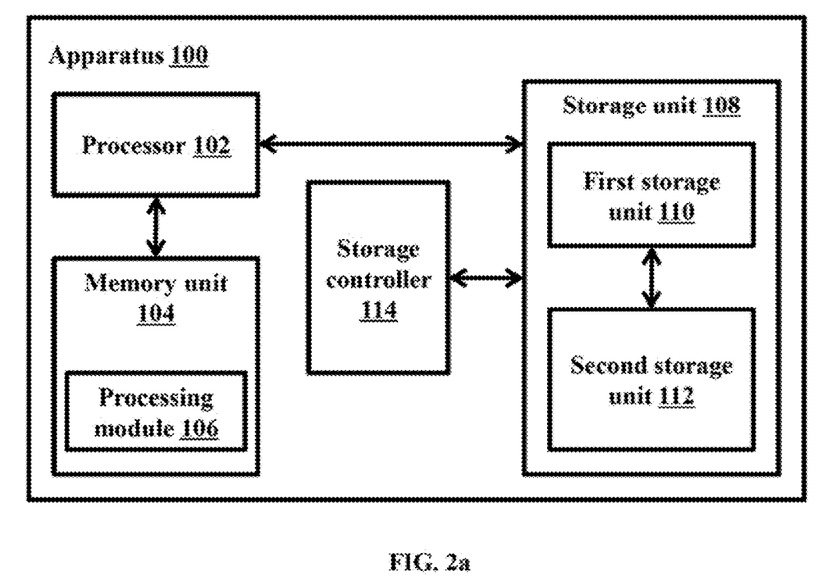
FIG. 2a is a block diagram illustrating an apparatus for accelerating tasks during storage caching and tiering in a computing environment, according to exemplary embodiments of the present disclosure.

FIG. 2a is a block diagram illustrating an apparatus 100 for accelerating tasks during storage caching and tiering in the computing environment, according to exemplary embodiments of the present disclosure.

The apparatus 100 includes a processor 102, a memory unit 104, a storage unit 108, and a storage controller 114. Further, the apparatus 100 may include a processing module 106 coupled to the memory unit 104. When machine readable instructions are executed, the processing module 106 causes the apparatus 100 to process the data in the computing environment. Furthermore, the storage unit 108 may include a first storage unit 110 and a second storage unit 112. The storage unit 108 maybe coupled to the storage controller 114. The storage controller 114 coupled to the storage unit 108 may include a host interface, a Dynamic Random Access Memory (DRAM), a static RAM, a memory interface 140, a central processing unit (CPU), a bus, a workload module, a timer, a throttling module, a clock generator, mapping and/or translation between virtual addresses (e.g., logic block addresses (LBAs)) and physical addresses of memory media devices, and/or other similar components. The processor 102 may be coupled to the memory unit 104, one or more first storage unit 110 and one or more second storage unit 112. The first storage unit 110 may function as a system memory, and/or a cache for the second storage unit 112. The first storage unit 110 and the second storage unit 112 may include disk arrays or a tier of disk arrays.

The second storage unit 112 may be a cache for a third storage unit. The third storage unit may be a cache for a fourth storage unit. In an exemplary embodiment of the present disclosure, each tier of the storage unit may be progressively slower and larger than the last storage unit. For example, the fourth storage unit may be a cloud storage solution or tape cartridges and tape drives, while the third storage unit may be a local hard disk drive with relatively less storage space, but relatively faster access time. As a cache, the third storage unit may store a subset of the total data stored on the fourth storage unit. The second storage unit 112 may be an SSD with relatively less storage space than the third storage unit, but relatively faster access time. As a cache, the second storage unit 112 may store a subset of the data stored on the third storage unit. Accordingly, new data written to the first storage unit 110 is eventually written to the second storage unit 112 and also eventually written to the third storage unit and the fourth storage unit and so on.

The storage unit 108 may include a processor, a non-volatile memory (NVM), and/or a volatile memory. The first storage unit 110 can be a system memory, a flash memory, a solid state drive (SSD), a secure digital (SD) card, a micro-SD card, and/or a similar component. The second storage unit 112 can be a Hard Disk Drive (HDD), a non-volatile memory (NVM), a cloud storage, a tape library, a magnetic tape cartridge, a tape drive, a virtual tape, a Network Attached Storage (NAS), direct attached storage (DAS), a Content Addressable Storage (CAS), a Cluster File Systems (CFS) and/or a similar component.

The apparatus 100 can be a desktop computer, a hand-held device, a multiprocessor system, a microprocessor based programmable consumer electronics, a laptop, a server, a network computer, a minicomputer, a mainframe computer, a camera, a video camera, an IoT (Internet of Things) device, a wearable computing device, a personal assistant device, a vehicle infotainment system, and/or a similar component.

The processor 102 or the first storage unit 110 may communicate with the second storage unit 112 using at least one interface protocol, for example, a Peripheral Component Interconnect Express (PCIe), an Advanced Technology Attachment (ATA), a Serial ATA (SATA), a Parallel ATA (PATA), a Serial Attached Small Computer System Interface (SAS), a Storage Area Network (SAN), a ATA over Ethernet (AoE), a Fiber Channel Protocol (FCP), a Fiber Channel over Ethernet (FCoE), an Enterprise Systems Connection (ESCON) over Fiber Channel, an Internet Small Computer Systems Interface (iSCSI), and/or a similar protocol.

The apparatus 100 may comprise other components such as an input/output interface, a communication interface, etc. The apparatus 100 may comprise a user application interface, an application management framework, and/or an application framework for accelerating the tasks during storage caching and tiering. The application framework may comprise different modules and sub modules to execute the operation for accelerating the tasks during storage caching and tiering. The application framework can be a software library that provides a fundamental structure to support the development of applications for a specific environment. The application framework may also be used in developing graphical user interface (GUI) and web-based applications.

In an exemplary embodiment of the present disclosure, the methods herein may be implemented using the apparatus 100. Exemplary embodiments of the present disclosure may perform specified manipulations of data or information in response to a command or set of commands provided by a user. The methods herein may be implemented using apparatus 100 such as a server. According to an exemplary embodiment of the present disclosure, the apparatus 100 may communicate with a server via a communication network for performing sync/read data operation from the first storage unit 110, residing in the apparatus 100, to the second storage unit 112, residing in the server.

In an exemplary embodiment of the present disclosure, the apparatus 100 is configured to receive a write data operation from the computing environment. In an exemplary embodiment of the present disclosure, the apparatus 100 is configured to determine an amount of dirty data (or size of dirty data) in the first storage unit 110, based on receiving the write data operation. The dirty data includes a dirty data present in the first storage unit 110 to be synced to the second storage unit 112. In an exemplary embodiment of the present disclosure, the apparatus 100 is configured to identify if the determined amount of dirty data in the first storage unit 110 corresponds to an amount that is greater than/less than a first threshold value and/or a second threshold value. Here, the first threshold value is less than the second threshold value. In an exemplary embodiment of the present disclosure, the apparatus 100 is configured to decelerate a sync rate associated with a read data operation from the first storage unit 110 to the second storage unit 112, if the determined amount of the dirty data is less than the first threshold value. In an exemplary embodiment of the present disclosure, the apparatus 100 is configured to decelerate a write rate associated with the write data operation from the computing environment to the first storage unit 110, if the determined amount of the dirty data is greater than the second threshold value. In an exemplary embodiment of the present disclosure, the apparatus 100 is configured to accelerate the sync rate associated with the read data operation from the first storage unit 110 to the second storage unit 112, if the determined amount of the dirty data is greater than the second threshold value. In an exemplary embodiment of the present disclosure, the apparatus 100 is configured to accelerate a write rate associated with the write data operation from the computing environment to the first storage unit 110, if the determined amount of the dirty data is less than the second threshold value.

In an exemplary embodiment of the present disclosure, the apparatus 100 is configured to identify if the first storage unit 110 corresponds to at least one Non-Volatile Memory express-Solid State Drive (NVMe-SSD). In an exemplary embodiment of the present disclosure, the apparatus 100 is configured to assign a weighted score to the read data operation and/or the received write data operation based on at least one parameter, if the first storage unit 110 corresponds to NVMe-SSD. In an exemplary embodiment of the present disclosure, the weighted score is assigned to the write data operation, based on at least one parameter such as a priority data, a type of application associated with the received write data operation, the determined remaining data capacity, the dirty data in the first storage unit 110, a metadata, a user data, a header, an internal input/output operation and an external input/output operation, and/or a classification associated with the received write data operation.

In an exemplary embodiment of the present disclosure, the apparatus 100 is configured to determine priority of at least one of the read data operation and the received write data operation based on the assigned weighted score. In an exemplary embodiment of the present disclosure, the apparatus 100 is configured to arbitrate, using a storage controller unit 114 coupled to the processor 102, a queue sequence corresponding to at least one of the write data operation and the read data operation, using Weighted Round Robin (WRR) arbitration method, based on the determined priority. In an exemplary embodiment of the present disclosure, the apparatus 100 is configured to cause the arbitrated queue sequence corresponding to the write data operation, to accelerate and/or decelerate the write rate based on the determined priority and if the determined amount of the dirty data in the first storage unit 110 is greater than/less than the first threshold value/the second threshold value, respectively. In an exemplary embodiment of the present disclosure, the apparatus 100 is configured to cause the arbitrated queue sequence corresponding to the read data operation, to accelerate/decelerate the sync rate based on the determined priority and if the determined amount of the dirty data in the first storage unit 110 is greater than/less than the first threshold value/the second threshold value, respectively. In an exemplary embodiment of the present disclosure, acceleration and deceleration of the write data operation and read data operation is based on the determined amount of the dirty data being greater than or less than the first threshold value and the second threshold value, respectively.

The process of determining the order of command execution is known as arbitration in NVMe. Accordingly, various arbitration mechanisms may be set forth in the NVMe specification, such as round robin arbitration (where all submission queues (SQ) are treated with equal priority).

However, in the present disclosure, the Weighted Round Robin (WRR) arbitration with urgent priority (where priority is given to certain submission queues (SQ) over others) is used as an example of an arbitration mechanism. However, other suitable arbitration mechanisms may alternatively be used. The arbitration mechanism can also be a vendor-specific arbitration.

In an exemplary embodiment of the present disclosure, the apparatus 100 is configured to identify if the determined amount of the dirty data in the first storage unit 110 is between the first threshold value and the second threshold value. In an exemplary embodiment of the present disclosure, the apparatus 100 is configured to perform the write data operation and the read data operation at equal rates, if the determined amount of the dirty data in the first storage unit 110 is between the first threshold value and the second threshold value.

In an exemplary embodiment of the present disclosure, the apparatus 100 is configured to determine, if the first storage unit 110 is idle, if there is no write data operation in the first storage unit 110. In an exemplary embodiment of the present disclosure, the apparatus 100 is configured to accelerate the sync rate associated with the read data operation, from the first storage unit 110 to the second storage unit 112, if the first storage unit 110 is idle.

In an exemplary embodiment of the present disclosure, the apparatus 100 is configured to identify if the remaining data capacity in the first storage unit 110 is zero. The remaining data capacity in the first storage unit 110 being zero indicates that there is no clean space in the first storage unit 110. In an exemplary embodiment of the present disclosure, the apparatus 100 is configured to divert the write data operation to the second storage unit 112, after progressively decelerating the write rate to the first storage unit 110 for a pre-determined time. Diverting the write data operation to the second storage unit 112 is based on identifying that the remaining data capacity in the first storage unit 110 is zero.

In an exemplary embodiment of the present disclosure, the first storage unit 110 includes a cache unit and/or a tier unit. In an exemplary embodiment of the present disclosure, the first storage unit 110 is a relatively fast disk drive and the second storage unit is a relatively slow disk drive. In an exemplary embodiment of the present disclosure, the first threshold value and/or the second threshold value is dynamically assigned using an asymmetric distribution method. The Asymmetrical distribution can be a situation in which the values of variables occur at irregular frequencies and the mean, median and mode occur at different points. The asymmetric distribution may exhibit skewness. The skewness can be a measure of the asymmetry of the probability distribution of a real-valued random variable about its mean In an exemplary embodiment of the present disclosure, the write data operation comprises an external input/output operation and the read data operation comprises an internal input/output operation. In an exemplary embodiment of the present disclosure, accelerating and decelerating the write rate and the sync rate comprise allocating a read bandwidth corresponding to a read data operation and/or a write bandwidth corresponding to a write data operation. In an exemplary embodiment of the present disclosure, accelerating and decelerating comprises progressively increasing and/or progressively decreasing the sync rate and/or the write rate.

In an exemplary embodiment of the present disclosure, the weighted score is assigned to the read data operation based on the determined amount of the dirty data in the first storage unit 110. In an exemplary embodiment of the present disclosure, assigning the weighted score to the write data operation and read data operation further comprises classifying the write data operation and the read data operation into a high priority, medium priority and/or a low priority. In an exemplary embodiment of the present disclosure, checking if the determined amount of the dirty data in the first storage unit 110 is between the first threshold value and the second threshold value includes determining whether the size of remaining data capacity present is between the first threshold value and the second threshold value.

FIG. 2*a* illustrates functional components of the computer implemented system in accordance with exemplary embodiments of the present disclosure. In some cases, the component may be a hardware component, a software component, or a combination of hardware and software. Some of the components may be application level software, while other components may be operating system level software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described herein.

Figure 2B:
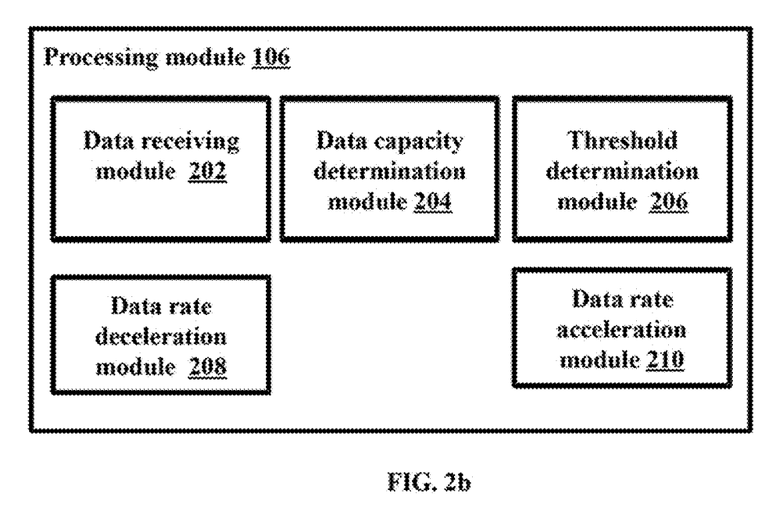
FIG. 2b is a detailed view illustrating a processing module as shown in FIG. 2a, comprising various modules, according to exemplary embodiments of the present disclosure.

FIG. 2*b* illustrates a processing module 106 as shown in FIG. 2*a*, comprising various modules, according to exemplary embodiments of the present disclosure, as disclosed herein. In an exemplary embodiment of the present disclosure, the apparatus 100 may comprise a processing module 106 stored in the memory unit 104, as shown in FIG. 2*a*. The processing module 106 may comprise a plurality of sub modules. The plurality of sub modules may include a data receiving module 202, a data capacity determination module 204, a threshold determination module 206, a data rate deceleration module 208, and a data rate acceleration module 210.

In an exemplary embodiment of the present disclosure the data receiving module 202 is configured to receive a write data operation from the computing environment. In an exemplary embodiment of the present disclosure, the data capacity determination module 204 is configured to determine an amount of the dirty data in the first storage unit 110, based on receiving the write data operation. The dirty data comprises data in the first storage unit 110 to be synced to the second storage unit 112. In an exemplary embodiment of the present disclosure, the data threshold determination module 206 is configured to check if the determined remaining data capacity of the first storage unit 110 is greater than/less than a first threshold value and a second threshold value.

In an exemplary embodiment of the present disclosure, the first threshold value is less than the second threshold value. In an exemplary embodiment of the present disclosure, the data rate deceleration module 208 is configured to decelerate a sync rate associated with a read data operation from the first storage unit 110 to the second storage unit 112, if the determined amount of the dirty data is less than the first threshold value. In an exemplary embodiment of the present disclosure, the data rate deceleration module 208 is configured to decelerate a write rate associated with the write data operation from the computing environment to the first storage unit 110, if the determined amount of the dirty data is greater than the second threshold value.

In an exemplary embodiment of the present disclosure, the data rate acceleration module 210 is configured to accelerate the sync rate associated with the read data operation from the first storage unit 110 to the second storage unit 112, if the determined amount of the dirty data is greater than the second threshold value. In an exemplary embodiment of the present disclosure, the data rate acceleration module 210 is configured to accelerate a write rate associated with the write data operation from the computing environment to the first storage unit 110, if the determined amount of the dirty data is less than the first threshold value.

Exemplary embodiments of the present disclosure may include hardware and/or software elements. The embodiments that are implemented in software may include firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Figure 3A:
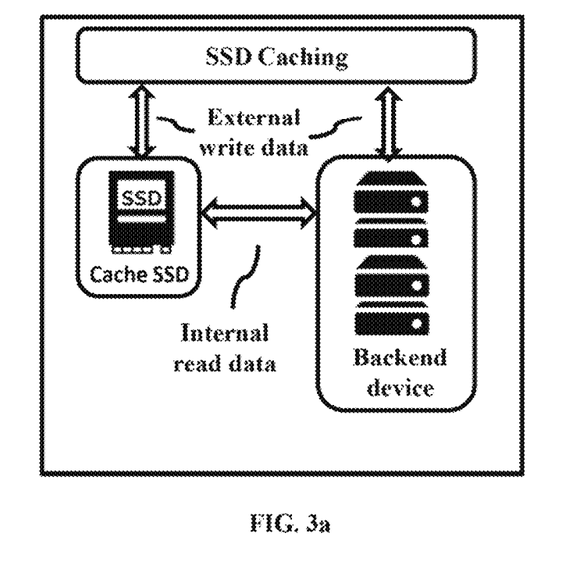
FIGS. 3a and 3b are block diagrams illustrating storage caching and storage tiering respectively, in a write back architecture, according to exemplary embodiments of the present disclosure.
Figure 3B:
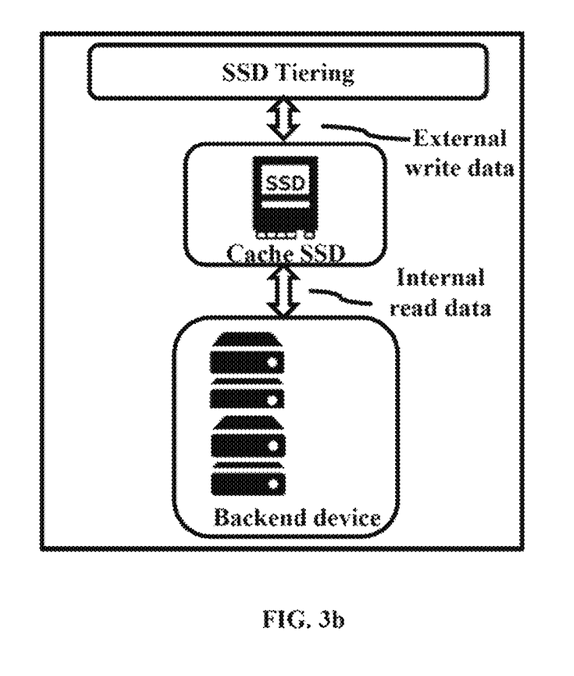

FIGS. 3a and 3b are block diagrams illustrating storage caching and storage tiering, respectively, in a write back architecture, according to exemplary embodiments of the present disclosure.

In an exemplary embodiment of the present disclosure, external I/Os can be the write data operation to caching unit and internal I/Os can be read data operation for syncing data from first storage unit 110 such as SSD to the backend device such as HDD (i.e. second storage unit 112).

In a write-back caching method, the faster device may execute the write data operation received from the user, an application, and/or another source. The data written to the first storage unit 110, such as SSD, may be synced later to a slow backend such as an HDD.

In a tiering method, the write data operation may be completed using a faster device such as an SSD. The data written to the first storage unit 110, such as an SSD, may be synced later to a slower backend such as an HDD in a tiering approach. For example, the data is synced to the first disk array of the second storage unit 112 and is later moved to a second disk array of the second storage unit 112. If the cache or the tier unit does not have clean space and/or no remaining data capacity, the write data operation may be bypassed to slower backend(s) such as the HDD.

Figure 4:
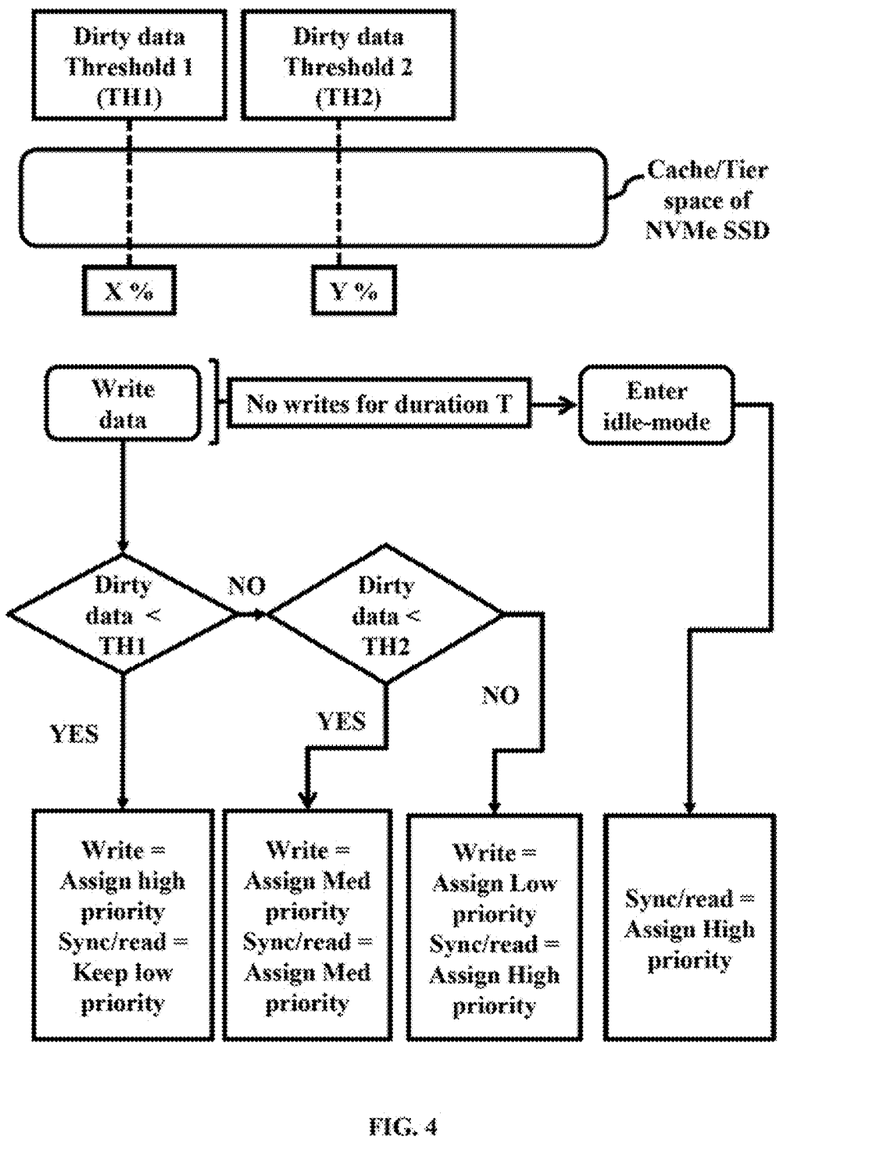
FIG. 4 is a flow chart illustrating a sequence for increasing and decreasing of write rate and read rate based on determined threshold value, according to exemplary embodiments of the present disclosure.

FIG. 4 is a flow chart illustrating a sequence for increasing and decreasing of write rate and read rate based on determined threshold value, according to exemplary embodiments of the present disclosure.

In an exemplary embodiment of the present disclosure, user writes/write data operation such as application data may be received as an input from the computing environment. The apparatus 100 may determine if the amount of the dirty data in the first storage unit 110 is between the threshold values. The first storage unit may include the dirty data. If the amount of the dirty data is less than TH1, the write data operation is assigned a high priority and sync/read data operation is assigned a low priority. If the amount of dirty data is not less than TH1 and not greater than TH2, then the write data operation and sync/read data operation are assigned medium priority. In addition, if the amount of dirty data is greater than TH2, then the write data operation is assigned a low priority and the sync/read data operation is assigned a high priority. Further, if there is no write data operation for a pre-determined period, then the sync/read data operation is assigned a high priority.

In an exemplary embodiment of the present disclosure, the first threshold value may be calculated as TH1 (i.e. TH1=X % of cache/tier data capacity), and the second threshold value maybe calculated as TH2 (i.e. TH2=Y % of cache/tier data capacity). Here X<Y and may allow asymmetric division of cache/tier data capacity. For example, X and Y can be chosen such that threshold yields asymmetric division of cache-capacity. For example, instead of TH1=33% and TH2=66%, the processor 102 may execute, TH1=25% and TH2=60%. For example, the processor may assign a third threshold value as TH3. Accordingly, the processor may execute the threshold values as TH1=25%, TH2=45% and TH3=60%. The threshold values can be dynamically changed by the processor 102 based on the requirement or based on the storage capacity of the first storage unit 110.

In an exemplary embodiment of the present disclosure, the WRR can be the arbitration method of storage controller 114 such as NVMe controller, where Input/output queues can be marked as urgent, high, medium or low priority. The weighted score may be assigned for high, medium and low priorities. Further commands may be fetched based on the weighted score. For example, if there are 3 queues and weights are 24, 16 and 8, then arbitration would take commands in 24:16:8 ratios from 3 queues.

Figure 5:
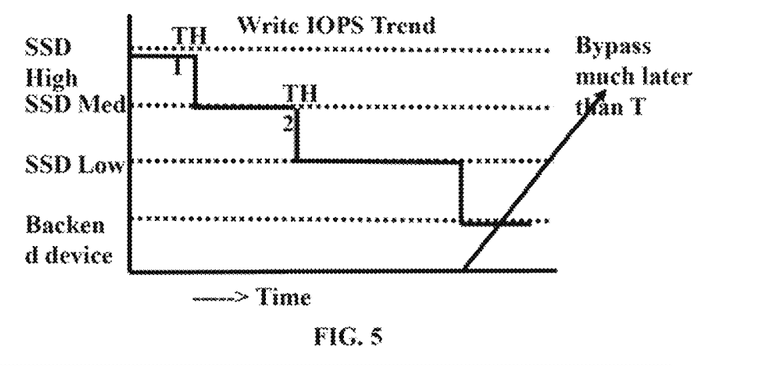
FIG. 5 is a graph illustrating bypass time related to write data operation, according to exemplary embodiments of the present disclosure.

FIG. 5 is a graph illustrating bypass time related to write data operation, according to exemplary embodiments of the present disclosure.

In an exemplary embodiment of the present disclosure, the processor 102 is configured to divert the write data operation to the second storage unit 112, after progressively decelerating the write rate to the first storage unit 110. In an exemplary embodiment of the present disclosure, the write data operation to the second storage unit 112 is based on identifying the remaining data capacity in the first storage unit is zero, after progressively decelerating the write rate to the first storage unit 110 for a pre-determined time. In an exemplary embodiment of the present disclosure, if there is no remaining data capacity, then the first storage unit 110 is completely filled with dirty data which may need to be synced to the second storage unit 112.

Figure 6A:
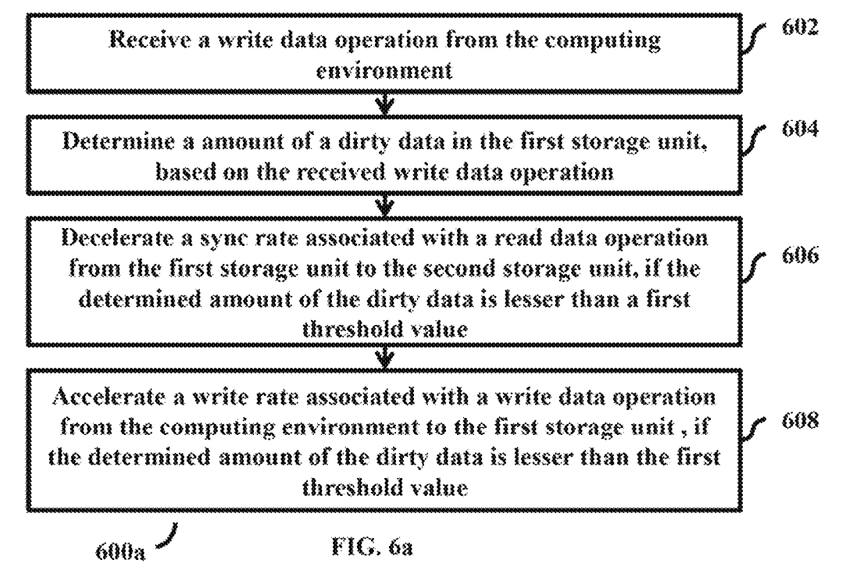
FIG. 6a is a flow chart illustrating a method for accelerating tasks during storage caching and tiering, in the computing environment, according to exemplary embodiments of the present disclosure.

FIG. 6a is a flow chart depicting a method 600a for accelerating tasks during storage caching and tiering, in computing environment, according to exemplary embodiments of the present disclosure.

At step 602, the method 600a includes receiving, by a processor 102, a write data operation from the computing environment. At step 604, the method 600a includes determining, by the processor 102, an amount of a dirty data in the first storage unit 110, based on the received write data operation. At step 606, the method 600a includes decelerating, by the processor 102, a sync rate associated with a read data operation from the first storage unit 110 to the second storage unit 112, if the determined amount of the dirty data is less than a first threshold value. At step 608, the method 600a includes accelerating, by the processor 102, a write rate associated with a write data operation from the computing environment to the first storage unit, if the determined amount of the dirty data is less than the first threshold value.

The various steps depicted in method 600a may be performed in the order presented, in a different order or simultaneously. Further, in some exemplary embodiments of the present disclosure, one or more of the steps depicted in FIG. 6a may be omitted.

Figure 6B:
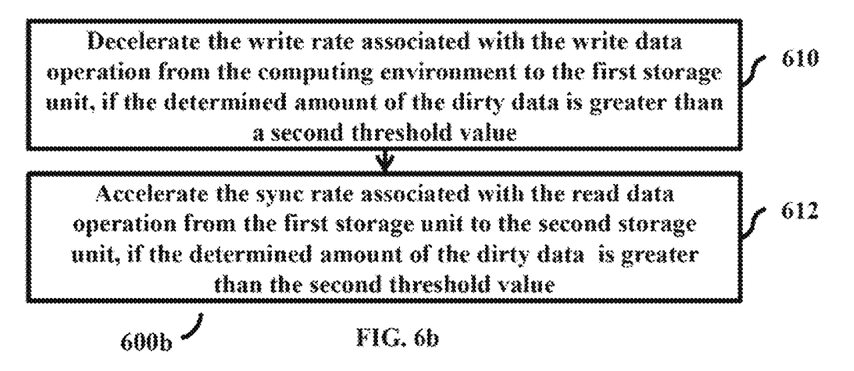
FIG. 6b is a flow chart illustrating a method for accelerating the sync rate associated with the read data operation from the first storage unit to the second storage unit, according to exemplary embodiments of the present disclosure.

FIG. 6b is a flow chart depicting a method 600b for accelerating the sync rate associated with the read data operation from the first storage unit 110 to the second storage unit 112, according to exemplary embodiments of the present disclosure.

At step 610, the method 600b includes decelerating, by the processor 102, a write rate associated with the write data operation from the computing environment to the first storage unit 110, if the determined amount of the dirty data is greater than a second threshold value. At step 612, the method 600b includes accelerating, by the processor 102, the sync rate associated with the read data operation from the first storage unit 110 to the second storage unit 112, if the determined amount of the dirty data is greater than the second threshold value.

The various steps depicted in method 600b may be performed in the order presented, in a different order or simultaneously. Further, in some exemplary embodiments of the present disclosure, one or more of the steps depicted in FIG. 6b may be omitted.

Figure 6C:
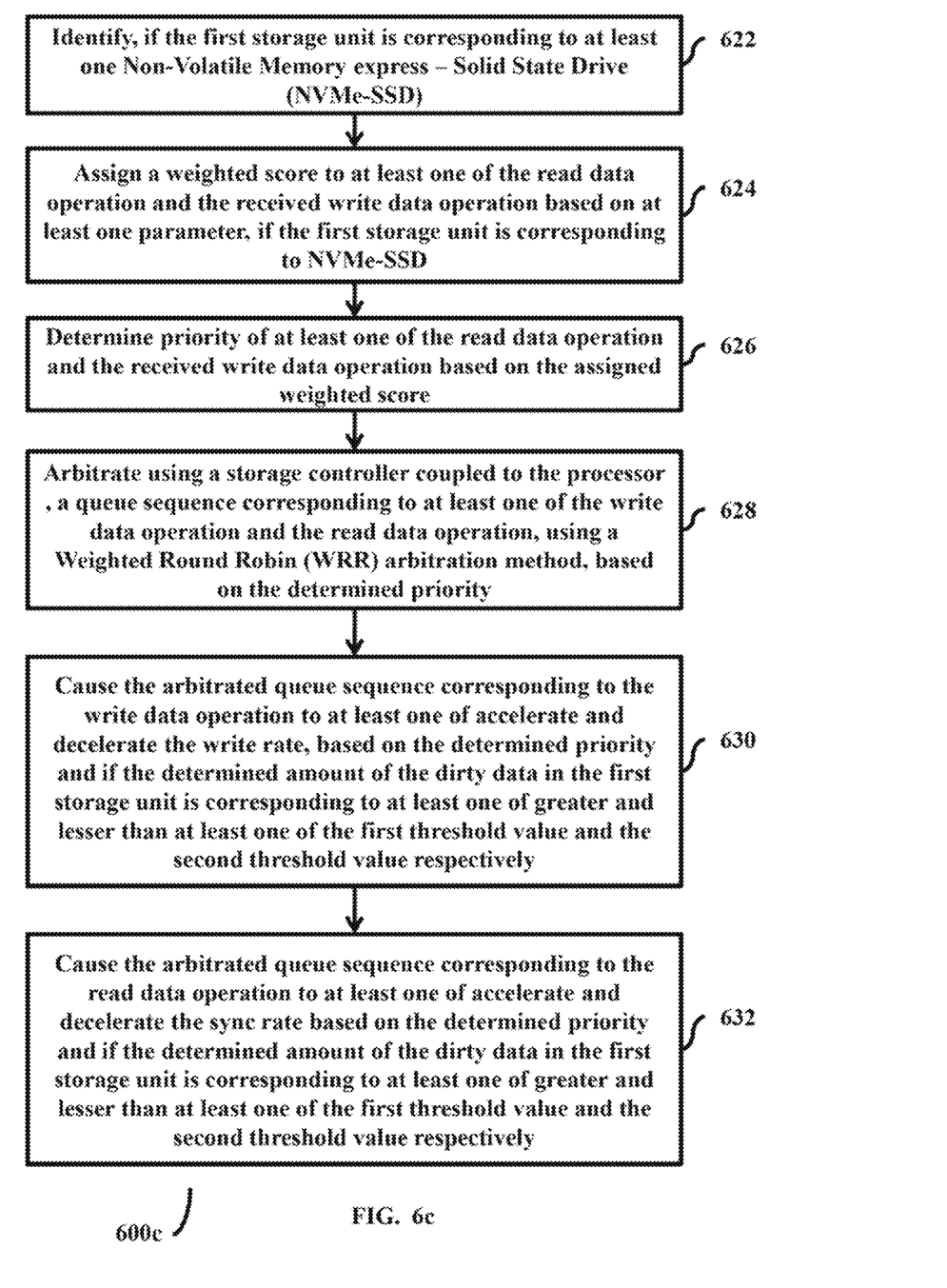
FIG. 6c is a flow chart illustrating a method for arbitrating a queue sequence corresponding to at least one of the write data operation and the read data operation, using a Non-Volatile Memory express—Weighted Round Robin (NVMe WRR) for a Non Volatile Memory express—Solid State Drive (NVMe-SSD) based storage devices, according to exemplary embodiments of the present disclosure.

FIG. 6c is a flow chart depicting a method 600c for arbitrating a queue sequence corresponding to at least one of the write data operation and the read data operation, using a Non-Volatile Memory express—Weighted Round Robin (NVMe WRR) for a Non Volatile Memory express-Solid State Drive (NVMe-SSD) based storage devices, according to exemplary embodiments of the present disclosure.

At step 622, the method 600c includes, identifying, by the processor 102, if the first storage unit 110 corresponds to at least one Non-Volatile Memory express-Solid State Drive (NVMe-SSD). At step 624, the method 600c includes assigning, by the processor 102, a weighted score to the read data operation and/or the received write data operation based on at least one parameter, if the first storage unit 110 corresponds to NVMe-SSD. At step 626, the method 600c includes determining, by the processor 102, priority of the read data operation and/or the received write data operation based on the assigned weighted score. At step 628, the method 600c includes arbitrating, by the processor 102, using a storage controller 114 coupled to the processor 102, a queue sequence corresponding to the write data operation and/or the read data operation, using a Weighted Round Robin (WRR) arbitration method, based on the determined priority. At step 630, the method 600c includes causing, by the processor 102, the arbitrated queue sequence corresponding to the write data operation to accelerate and/or decelerate the write rate, based on the determined priority and if the determined amount of the dirty data in the first storage unit 110 corresponds to greater than/less than the first threshold value/the second threshold value, respectively. At step 632, the method 600c includes causing, by the processor 102, the arbitrated queue sequence corresponding to the read data operation to accelerate/decelerate the sync rate based on the determined priority and if the determined amount of the dirty data in the first storage unit 110 corresponds to greater than/less than the first threshold value/the second threshold value, respectively.

The various steps depicted in method 600c may be performed in the order presented, in a different order or simultaneously. Further, in some exemplary embodiments of the present disclosure, one or more of the steps depicted in FIG. 6c may be omitted.

Figure 6D:
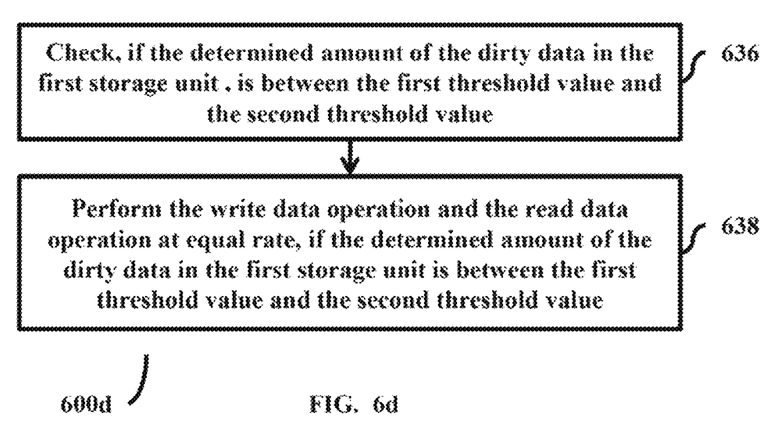
FIG. 6d is a flow chart illustrating a method for performing the write data operation and the read data operation at equal rate when the dirty data is between the first threshold value and the second threshold value, according to exemplary embodiments of the present disclosure.

FIG. 6d is a flow chart depicting a method 600d for performing the write data operation and the read data operation at equal rates if the dirty data is between the first threshold value and the second threshold value, according to exemplary embodiments of the present disclosure.

At step 636, the method 600d includes checking, by the processor 102, if the determined amount of the dirty data in the first storage unit 110, is between the first threshold value and the second threshold value. At step 638, the method 600d includes performing, by the processor 102, the write data operation and the read data operation at equal rates, if the determined amount of the dirty data in the first storage unit 110 is between the first threshold value and the second threshold value.

The various steps depicted in method 600d may be performed in the order presented, in a different order or simultaneously. Further, in some exemplary embodiments of the present disclosure, one or more of the steps depicted in FIG. 6d may be omitted.

Figure 6E:
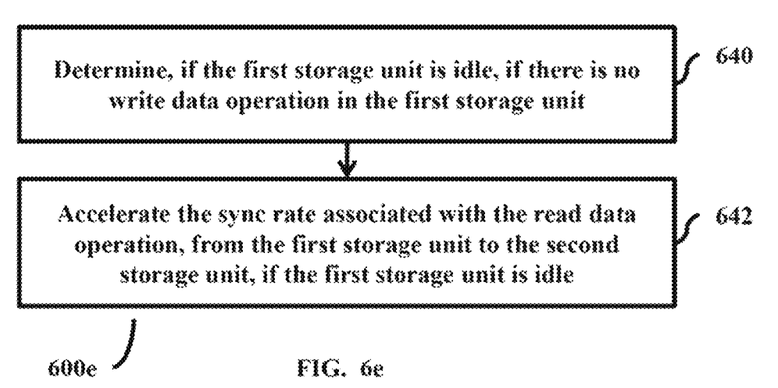
FIG. 6e is a flow chart illustrating a method for accelerating a sync rate associated with the read data operation, when first storage unit is idle, according to exemplary embodiments of the present disclosure.

FIG. 6e is a flow chart depicting a method 600e for accelerating a sync rate associated with the read data operation, if first storage unit is idle, according to exemplary embodiments of the present disclosure.

At step 640, the method 600e includes determining, by the processor 102, if the first storage unit 110 is idle, if there is no write data operation in the first storage unit 110. At step 642, the method 600e includes accelerating, by the processor 102, the sync rate associated with the read data operation, from the first storage unit 110 to the second storage unit 112, if the first storage unit 110 is idle.

The various steps depicted in method 600e may be performed in the order presented, in a different order or simultaneously. Further, in some exemplary embodiments of the present disclosure, one or more of the steps depicted in FIG. 6e may be omitted.

Figure 7:
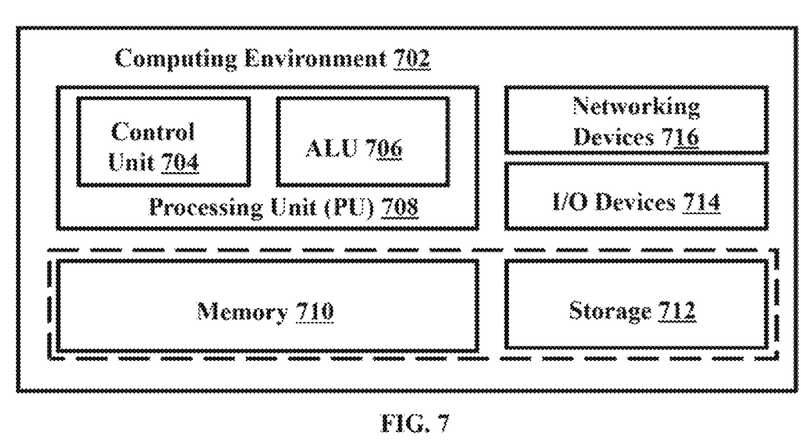
FIG. 7 illustrates a computing environment implementing an apparatus and methods for accelerating tasks during storage caching and tiering, according to exemplary embodiments of the present disclosure.

FIG. 7 illustrates a computing environment 702 implementing an apparatus and methods for accelerating tasks during storage caching and tiering, according to exemplary embodiments of the present disclosure.

As depicted in the figure, the computing environment 702 comprises at least one processing unit 708 that is equipped with a control unit 704 and an Arithmetic Logic Unit (ALU) 706, a memory 710, a storage unit 712, a plurality of networking devices 716 and a plurality of Input output (I/O) devices 714. The processing unit 708 is responsible for processing the instructions of the scheme. The processing unit 708 receives commands from the control unit to perform its processing. Further, any logical and arithmetic operations involved in the execution of the instructions may be computed with the help of the ALU 706. The overall computing environment 702 can may include multiple homogeneous or heterogeneous cores, multiple CPUs of different kinds, special media and/or other accelerators. The processing unit 708 is responsible for processing the instructions of the scheme. Further, a plurality of such processing units 708 may be located on a single chip or over multiple chips.

The scheme, comprising instructions and codes for the implementation of the methods described herein, are stored in either the memory unit 710, the storage 712 or both. At the time of execution, the instructions may be fetched from the corresponding memory 710 or storage 712 and executed by the processing unit 708.

Various networking devices 716 or external I/O devices 714 may be connected to the computing environment to support the implementation through the networking unit and the I/O device unit.

In an exemplary embodiment of the present disclosure, the computing environment 702 may be an electronic device, a server, a client device, and/or another form of computer device. The computing environment 702 may perform accelerating tasks during storage caching and tiering. The computing environment 702 may include the application management framework. The application management framework may include a plurality of processing modules 106 and sub modules. The processing modules 106 may be stored in the memory 710 of the storage unit 712.

The processing modules 106 may be responsible for the execution of the accelerating tasks during storage caching and tiering.

The write-back cache and tiering method using the computing environment 702 may share bandwidth of cache/tier unit between external write data operation and internal read data operation (sync induced). Accordingly, managing speed of external (user writes) the write data operation and internal read data operation (sync) adaptively, based on the size of dirty-data in cache/tier unit. The speed management for write rate and sync rate is dynamically performed by the processing unit 708.

Exemplary embodiments of the present disclosure may allow serving writes from faster cache/tier for longer amounts of time. The exemplary embodiments described herein may allow for reducing the occurrence of bypass-to-backend events within a given time, in turn achieving better performance. Exemplary embodiments described herein may utilize prioritization built inside NVMe WRR. Exemplary embodiments described herein allow for using inside storage/disk array (tiers). Exemplary embodiments described herein allow serving write data operation from faster cache/tier for longer amounts of time. Exemplary embodiments described herein may allow for implementation in cache units/devices which do not use NVMe.

The exemplary embodiments disclosed herein can be implemented through at least one software program running on at least one hardware device and performing network management functions to control the various elements that have been described herein. The elements shown in FIG. 2a can be a hardware device, or a combination of a hardware device and a software module.

The foregoing description of exemplary embodiments of the present disclosure may be modified and/or adapted for various applications and uses without departing from the general inventive concept, and, therefore, such adaptations and modifications should and are intended to be within the meaning and range of equivalents of the disclosed embodiments.

What is claimed is:

1. An apparatus for accelerating tasks during storage caching and tiering, in a computing environment, comprising:
   a processor;
   a first storage unit coupled to the processor;
   a second storage unit coupled to the processor;
   a memory unit coupled to the processor, wherein the memory unit comprises a processing module configured to:
   receive a write data operation from the computing environment;
   determine an amount of dirty data in the first storage unit, based on the received write data operation, wherein the dirty data comprises data present in the first storage unit to be synced to the second storage unit;
   progressively decrease a sync rate associated with a read data operation from the first storage unit to the second storage unit, when the determined amount of dirty data is less than a first threshold value, wherein decreasing the sync rate comprises lowering a priority by which the processor performs operations related to syncing; and
   progressively increase a write rate associated with a write data operation from the computing environment to the first storage unit, when the determined amount of dirty data is less than the first threshold value, wherein increasing the write rate comprises raising a priority by which the processor performs operations related to writing.

2. The apparatus as claimed in claim 1, wherein the processing module is further configured to:
   progressively decrease the write rate associated with the write data operation from the computing, environment to the first storage unit, when the determined amount of dirty data is greater than a second threshold value, wherein decreasing the write rate comprises lowering the priority by which the processor performs the operations related to writing; and
   progressively increase the sync rate associated with the read data operation from the first storage unit to the second storage unit, when the determined amount of dirty data is greater than the second threshold value, wherein increasing the sync rate comprises raising the priority by which the processor performs the operations related to syncing.

3. An apparatus for accelerating tasks during storage caching and tiering, in a computing environment, comprising:
   a processor;
   a first storage unit coupled to the processor;
   a second storage unit coupled to the processor;
   a memory unit coupled to the processor, wherein the memory unit comprises a processing module configured to;
   receive a write data operation from the computing environment;
   determine an amount of dirty data, in the first storage unit, based on the received write data operation, wherein the dirty data comprises data present in the first storage unit to be synced to the second storage unit;
   decelerate a sync rate associated with a read data operation from the first storage unit to the second storage unit, when the determined amount of dirty data is less than a first threshold value; and
   accelerate a write rate associated with a write data operation from the computing environment to the first storage unit, when the determined amount of dirty data is less than the first threshold value,
   wherein the processing module is further configured to:
   identify, when the first storage unit corresponds to at least one Non-Volatile Memory express-Solid State Drive (NVMe-SSD);
   assign a weighted score to the read data operation and/or the received write data operation, based on at least one parameter, when the first storage unit corresponds to NVMe-SSD;
   determine a priority of the read data operation and/or the received write data operation based on the assigned weighted score;
   arbitrate, using a storage controller coupled to the processor, a queue sequence corresponding to the write data operation and/or the read data operation, using a Weighted Round Robin (WRR) arbitration method, based on the determined priority;
   cause the arbitrated queue sequence corresponding to the write data operation to accelerate and/or decelerate the write rate, based on the determined priority and whether the determined amount of dirty data in the first storage unit is greater than and/or less than the first threshold value and/or the second threshold value, respectively; and
   cause the arbitrated queue sequence corresponding to the read data operation to accelerate and/or decelerate the sync rate based on the determined priority and whether the determined amount of dirty data in the first storage unit is greater than and/or less than the first threshold value and/or the second threshold value, respectively.

4. The apparatus as claimed in claim 3, wherein the weighted score is assigned to the write data operation based on at least one parameter comprises a priority data, a type of application associated with the received write data operation, a determined remaining data capacity of first storage unit, the amount of dirty data, a metadata, a user data, a header, an internal input/output operation, an external input/output operation, and/or a classification associated with the received write data operation.

5. The apparatus as claimed in claim 3, wherein the weighted score is assigned to the read data operation based on the determined amount of dirty data in the first storage unit.

6. The apparatus as claimed in claim 3, wherein assigning the weighted score to the write data operation and the read data operation, further comprises classifying the write data operation and the read data operation into a high priority, medium priority and/or a low priority.

7. The apparatus as claimed in claim 1, wherein the processing module is further configured to:
determine whether the determined amount of dirty data in the first storage unit, is between the first threshold value and the second threshold value; and
perform the write data operation and the read data operation at equal rates, when the determined amount of dirty data in the first storage unit is between the first threshold value and the second threshold value.

8. The apparatus as claimed in claim 1, wherein the processing module is further configured to:
determine whether the first storage unit is idle, when there is no write data operation in the first storage unit; and
progressively increase the sync rate associated with the read data operation, from the first storage unit to the second storage unit, when the first storage unit is idle, wherein increasing the sync rate comprises raising the priority by which the processor performs the operations related to syncing.

9. The apparatus as claimed in claim 1, wherein the first threshold value and/or the second threshold value is dynamically assigned using an asymmetric distribution method.

10. The apparatus as claimed in claim 1, wherein increasing/decreasing the write rate and the sync rate comprises allocating a read bandwidth corresponding to read data operation and a write bandwidth corresponding to write data operation, respectively.

11. A method for accelerating tasks during storage caching and tiering, n a computing environment comprising:
receiving, by a processor, a write data operation from the computing environment;
determining, by the processor, an amount of dirty data in the first storage unit, based on the received write data operation, wherein the dirty data comprises data present in the first storage unit to be synced to the second storage unit;
progressively decreasing, by the processor, a sync rate associated with a read data operation from the first storage unit to the second storage unit, when the determined amount of dirty data is less than a first threshold value, wherein decreasing the sync rate comprises lowering a priority by which the processor performs operations related to syncing; and
progressively increasing, by the processor, a write rate associated with a write data operation from the computing environment to the first storage unit, when the determined amount of dirty data is less than the first threshold value, wherein increasing the write rate comprises raising a priority by which the processor performs operations related to writing.

12. The method of claim 11, further comprising:
progressively decreasing, by the processor, the write rate associated with the write data operation from the computing environment to the first storage unit, when the determined amount of dirty data is greater than a second threshold value, wherein decreasing the write rate comprises lowering the priority by which the processor performs the operations related writing; and
progressively increasing, by the processor, the sync rate associated with the read data operation from the first storage unit to the second storage unit, when the determined amount of dirty data is greater than the second threshold value, wherein increasing the sync rate comprises raising the priority by which the processor performs the operations related to syncing.

13. The method as claimed in claim 11, further comprising:
identifying, by the processor, whether the first storage unit corresponds to at least one Non-Volatile Memory express-Solid State Drive (NVMe-SSD);
assigning, by the processor, a weighted score to the read data operation and/or the received write data operation based on at least one parameter, when the first storage unit corresponds to NVMe-SSD;
determining, by the processor, the priority by which the processor performs the operations related to reading and/or the operations related to syncing based on the assigned weighted score;
arbitrating, by the processor, using a storage controller coupled to the processor, a queue sequence corresponding to the write data operation and/or the read data operation, using a Weighted Round Robin (WRR) arbitration method, based on the determined priority;
causing, by the processor, the arbitrated queue sequence corresponding to the write data operation to progressively increase and/or progressively decrease the write rate, based on the determined priority and whether the determined amount of the dirty data in the first storage unit is greater than/less than the first threshold value/the second threshold value, respectively; and
causing, by the processor, the arbitrated queue sequence corresponding to the read data operation to progressively increase and/or progressively decrease the sync rate based on the determined priority and whether the determined amount of dirty data in the first storage unit is greater than/less than the first threshold value/the second threshold value, respectively.

14. The method as claimed in claim 13, wherein the weighted score is assigned to the write data operation based on at least one parameter comprising a priority data, a type of application associated with the received write data operation, the determined remaining data capacity of first storage unit, the amount of dirty data, a metadata, a user data, a header, an internal input/output operation, an external input/output operation, and/or a classification associated with the received write data operation.

15. The method as claimed in claim 13, wherein the weighted score is assigned to the read data operation based on the determined amount of dirty data in the first storage unit.

16. The method as claimed in claim 13, wherein assigning the weighted score to the write data operation and the read data operation, further comprises classifying the write data operation and the read data operation into a high priority, medium priority and/or a low priority.

17. The method as claimed in claim 11, further comprising:
   checking, by the processor, when the determined amount of dirty data in the first storage unit, is between the first threshold value and the second threshold value; and
   performing, by the processor, the write data operation and the read data operation at an equal rate, when the determined amount of dirty data in the first storage unit is between the first threshold value and the second threshold value.

18. The method as claimed in claim 11, further comprising:
   determining, by the processor, when the first storage unit is idle, when there is no write data operation in the first storage unit; and
   accelerating, by the processor, the sync rate associated with the read data operation, from the first storage unit to the second storage unit, when the first storage unit is idle.

19. The method as claimed in claim 11, wherein the first threshold value and/or the second threshold value is dynamically assigned using an asymmetric distribution method.

* * * * *